United States Patent
Shimizu et al.

(10) Patent No.: US 6,496,534 B1
(45) Date of Patent: Dec. 17, 2002

(54) CDMA RECEIVER WITH WEIGHTED INTERFERENCE CANCELLATION

(75) Inventors: Satoru Shimizu; Eiichiro Kawakami; Kiyohito Tokuda, all of Tokyo (JP)

(73) Assignee: Oki Electronic Industry Co., Ltd., Tokyo (JP)

( * ) Notice: Subject to any disclaimer, the term of this patent is extended or adjusted under 35 U.S.C. 154(b) by 0 days.

(21) Appl. No.: 08/883,959

(22) Filed: Jun. 27, 1997

(30) Foreign Application Priority Data

Jul. 12, 1996 (JP) ............................................. 8-183593

(51) Int. Cl.[7] .............................................. H04B 15/00
(52) U.S. Cl. ...................................... 375/148; 370/335
(58) Field of Search ................................ 375/206, 200, 375/130, 140, 147, 148; 370/335

(56) References Cited

U.S. PATENT DOCUMENTS

| | | |
|---|---|---|
| 5,151,919 A | 9/1992 | Dent |
| 5,218,619 A | 6/1993 | Dent |
| 5,377,183 A * | 12/1994 | Dent ........................... 370/335 |
| 5,394,434 A | 2/1995 | Kawabe et al. |
| 5,463,660 A | 10/1995 | Fukasawa et al. |
| 5,467,368 A | 11/1995 | Takeuchi et al. |
| 5,533,012 A * | 7/1996 | Fukasawa ..................... 370/18 |
| 5,579,304 A | 11/1996 | Sugimoto et al. |
| 5,671,221 A * | 9/1997 | Yang ........................... 370/335 |
| 5,692,006 A * | 11/1997 | Ross ............................ 375/147 |
| 5,694,388 A * | 12/1997 | Sawahashi et al. ......... 375/206 |
| 5,724,378 A * | 3/1998 | Miki et al. ................... 375/200 |
| 5,790,588 A * | 8/1998 | Fukawa et al. ............. 375/206 |
| 5,815,527 A * | 9/1998 | Erving et al. ............... 375/206 |

FOREIGN PATENT DOCUMENTS

JP          07303092 A          11/1995

* cited by examiner

*Primary Examiner*—Chi Pham
*Assistant Examiner*—Kevin M. Burd
(74) *Attorney, Agent, or Firm*—Rabin & Berdo, P.C.

(57) ABSTRACT

A code division multiple access receiver estimates symbol values transmitted by different stations by despreading a combined received signal, weights the estimated symbol values by use of weighting factors calculated for the different stations, respreads the weighted symbol values to estimate the interference due to each station, and subtracts the estimated interference from the received signal to produce a residual signal. The weighting factors can be calculated from the residual signal; the weighting factors are calculated so as to minimize the power of the residual signal. The weighting factors are adjusted at certain intervals, preferably at intervals determined from the rate of fading of the received signal.

43 Claims, 11 Drawing Sheets

CDMA RECEIVER WITH WEIGHTED INTERFERENCE CANCELLATION

BACKGROUND OF THE INVENTION

The present invention relates to a code division multiple access communications receiver, more particularly to a receiver for use in the base stations and mobile stations of a code division multiple access mobile communications system.

Code division multiple access (hereinafter, CDMA) is undergoing intensive development as a technique for using bandwidth more efficiently in mobile communications systems. CDMA uses a spectrum spreading process to enable multiple signals to share the same frequency band. A desired signal is extracted from the shared band by a de-spreading process.

In a direct sequence CDMA system, the different signals are distinguished by the use of different spreading codes. When a signal is extracted, the extracted signal usually contains interference from other signals, due to imperfect orthogonality of the spreading codes and other factors.

A known method of canceling this so-called co-channel interference estimates the signal received from each transmitting station on each transmission path, and subtracts, from the combined received signal, the signals estimated to have been received from stations other than the desired station. The subtractions may be performed one after another in a serial manner, or they may be performed in a parallel manner after all signals have been estimated. In estimating the received signals, it is also necessary to estimate the behavior of the radio channels, which distort the phase and amplitude of the signal on each transmission path from each station.

Accurate radio channel estimation is difficult, however, particularly in the parallel case. Therefore, co-channel interference continues to be a problem in CDMA communications.

SUMMARY OF THE INVENTION

It is accordingly an object of the present invention to reduce co-channel interference in the reception of a CDMA signal.

Another object of the invention is to improve the estimation of symbol values in the reception of a CDMA signal.

Another object of the invention is to improve the estimation of the radio channels in the reception of a CDMA signal.

The invented CDMA receiver receives a combined signal from a plurality of transmitting stations, despreads the received signal, thereby estimates the symbol values respreads the symbol values, thereby estimates the signals received from each transmitting station, and subtracts these estimated signals as estimated interference from the received signal, thereby producing a residual signal. The CDMA receiver also weights the estimated symbol value by multiplication by respective weighting factors when the estimated symbol values are respread. The weighting factors are adjusted at certain intervals.

The weighting factors are calculated so as to reduce the power of the residual signal. According to one aspect of the invention, the weighting factors are calculated from the values of the residual signal, using a mathematical technique such as the least mean square-method. According to another aspect of the invention, a hard decision is made as to the symbol values before the symbol values are weighted and respread, and the weighting factors are calculated from the differences between the estimated symbol values before the hard decision and the values after the hard decision.

The weighting factors may be used as digital filter coefficients, by convolving the symbol value or values estimated to have been received from the same transmitting station over a certain period of time with two or more weighting factors.

Besides estimating the symbol values transmitted by each station, the invented CDMA receiver preferably estimates the distortion in each transmission channel, and in estimating the signal received from each station (the estimated interference due to the station), the CDMA receiver preferably includes the estimated distortion. In this case, the weighting factors may be applied to the estimated phase and amplitude distortions, thereby indirectly applying the weighting factors to the estimated symbol values.

The CDMA receiver may combine the received signal to allow for path diversity from each transmitting station. In this case, separate weighting factors are calculated for each path, a separate estimated interference value is obtained for each path, and the estimated interference values for different paths from the same transmitting station are added together to obtain the estimated interference due to that station.

The process of estimating the symbol values and estimating and subtracting interference may be carried out in multiple stages, the residual signal output by each stage becoming the input signal to the next stage.

Subtraction of estimated interference may be carried out in either a serial or a parallel manner. In the parallel case, the estimated interference values are subtracted all at once, after the interference due to all transmitting stations has been estimated. In the serial case, the estimated interference due to each station is subtracted as soon as the estimate has been made. In the serial case, when the weighting factors are calculated from the residual signal, the residual signal from which the weighting factors for each transmitting station are calculated may be the intermediate residual signal left immediately after subtraction of that station's estimated interference. Alternatively, the weighting factors for all transmitting stations may be calculated from the same residual signal, this being the residual signal left after all stations' estimated interference has been subtracted.

DETAILED DESCRIPTION OF THE INVENTION

Figure 1:
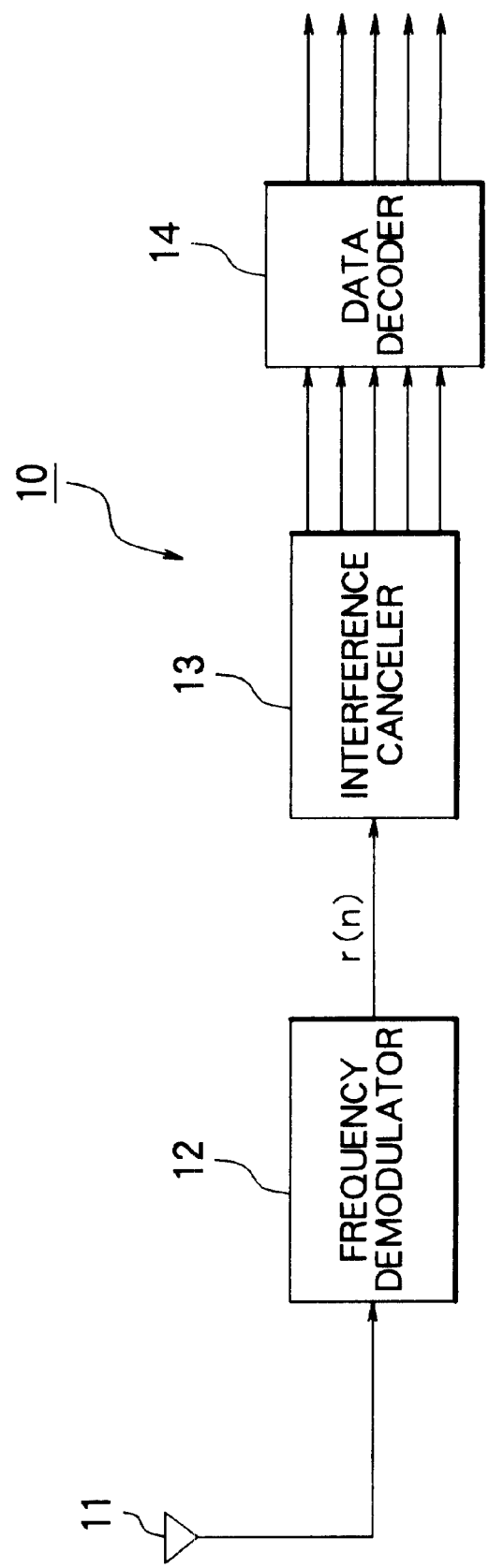
FIG. 1 is a general block diagram of the invented CDMA receiver.

Embodiments of the invention will be described with reference to the attached illustrative drawings, after an explanation of basic principles.

The baseband signal $r_i(n)$ transmitted by the i-th transmitting station at an arbitrary time n can be represented as follows, where $d_i$ is the symbol data transmitted by the station at that time, $PN_i(n)$ is a pseudorandom noise code assigned to the i-th station as a spreading code, the possible values of $d_i$ and $PN_i$ are plus and minus one, and i is an integer identifying the station.

$$r_i(n) = d_i \times PN_i(n)$$

When there are M transmitting stations, and the signal from the i-th station undergoes a distortion $z_i$ in the transmission channel, the combined received signal r(n) can be expressed as follows.

$$r(n) = \sum_{i=1}^{M} r_i(n) \times z_i$$

A symbol transmitted by the i-th station is extracted by correlating the received signal r(n) with the spreading code $PN_i(n)$ during the symbol interval. If the symbol interval is from n=1 to n=G, where G is the process gain of the code, the calculation is performed as follows.

$$R_i = (1/G) \times \sum_{n=1}^{G} \left( PN_i(n) \times \sum_{j=1}^{M} r_j(n) \times z_j \right)$$

$$= (d_i \times z_i) + \left[ (1/G) \times \sum_{n=1}^{G} \left( PN_i(n) \times \sum_{\substack{j=1 \\ j \neq i}}^{M} r_j(n) \times z_j \right) \right]$$

The first term $(d_i \times z_i)$ on the right side of the above equation represents the desired signal, while the second term represents co-channel interference.

In the present invention, the distortion $z_i$ on each transmission path is estimated, by use of a pilot signal, for example, and the extracted symbol value $R_i$ is corrected accordingly. This operation can be represented as follows, where $z_i'$ is the estimated distortion, $z_i'^*$ is the complex conjugate of $z_i'$, and $\Delta z_i$ is the product of $z_i$ and $z_i'^*$.

$$R_i' = (d_i \times \Delta z_i) + \left\{ (1/G) \times z_i'^* \times \sum_{n=1}^{G} \left[ PN_i(n) \times \sum_{\substack{j=1 \\ j \neq i}}^{M} r_j(n) \times z_j \right] \right\}$$

The value of $R_i'$ differs from the correct symbol value $d_i$ because of the error $\Delta z_i$ in estimating the distortion, and because of co-channel interference. Bit errors therefore occur when the $R_i'$ values are further demodulated by making a hard decision as to the symbol data (e.g. plus one or minus one) represented by each $R_i'$.

The bit error rate can be reduced by estimating the interfering transmitted signals and subtracting the estimated interference. For example, when a hard decision $d_i'$ has been made for a symbol transmitted by the i-th station, this symbol can be respread and subtracted from the received signal, so that it will not interfere with the demodulation of other signals. The estimated distortion $z_i'$ is re-included in the respreading operation. The respreading and subtraction are performed as follows to produce a residual signal e(n).

$$e(n) = r(n) - [d_i' \times PN_i(n) \times z_i']$$

$$= \left[ \sum_{\substack{j=1 \\ j \neq i}}^{M} r_j(n) \times z_j \right] + [(d_i \times z_i) - (d_i' \times z_i')] \times PN_i(n)$$

If the hard decision is correct ($d_i'=d_i$), and the estimated distortion $z_i'$ is close to the true distortion $z_i$, then most of the interference caused by the i-th station can be removed in this way before other stations' received signals are extracted. If the hard decision is incorrect, however, or if the estimated distortion $z_i'$ differs greatly from the true distortion $z_i$, then subtraction of the respread signal $d_i' \times PN_i(n) \times z_i'$ becomes less effective as a method of canceling interference, and may even worsen the interference.

In the present invention, accordingly, the respread signal is multiplied by a weighting factor $w_i$, which is adjusted so as to minimize the energy of e(n). That is, the residual signal e(n) is calculated as follows and is treated as an error signal, and $w_i$ is adjusted, by the least mean square method, for example, to minimize the mean square error $|e(n)|^2$.

$$e(n) = \left[ \sum_{\substack{j=1 \\ j \neq i}}^{M} r_j(n) \times z_j \right] + [(d_i \times z_i) - (d_i' \times z_i' \times w_i)] \times PN_i(n)$$

The accuracy of the demodulated data can be improved by subtracting as many respread and weighted signals as possible before extracting the signal of the desired station. In a so-called Rake receiver that combines the received signal with different delays to allow for path diversity, the respreading and weighting operation should be performed separately for each path.

Further gains in accuracy are possible by repetition of this interference cancellation process in a second processing stage. At the end of the first stage, when the interference signals of all transmitting stations have been subtracted, the residual signal e(n) is given as follows.

$$e(n) = \sum_{j=1}^{M} \{ [(d_j \times z_j) - (d_j' \times z_j' \times w_j)] \times PN_j(n) \}$$

The signal received from the i-th station can now be more accurately extracted by first adding the i-th respread and weighted signal $d_i' \times z_i' \times w_i \times PN_i(n)$ to e(n) and correlating the resulting sum with $PN_i$, or more simply, by correlating $PN_i(n)$ with e(n) and adding $d_i' \times z_i \times w_i$ to the result. The only interference present this time is the interference left in the residual signal e(n), which is usually less than the interference present in the original received signal r(n).

After the signals from all stations have been re-extracted in this way, and have been respread, weighted, and subtracted from e(n), the same process can be repeated in further stages to gain further accuracy.

In the descriptions that follow, identical or similar constituent elements occurring in different embodiments will have the same reference numerals.

First Embodiment

Figure 2:
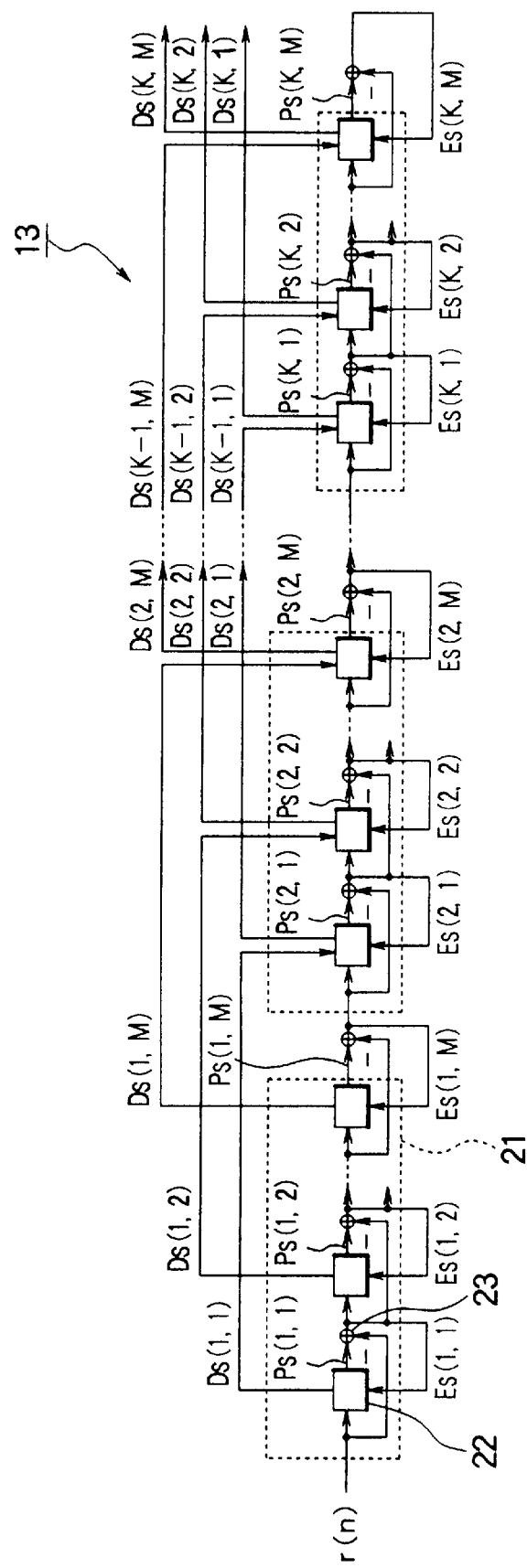
FIG. 2 is a more detailed block diagram showing the internal structure of the interference canceler in a first embodiment of the invention.
Figure 3:
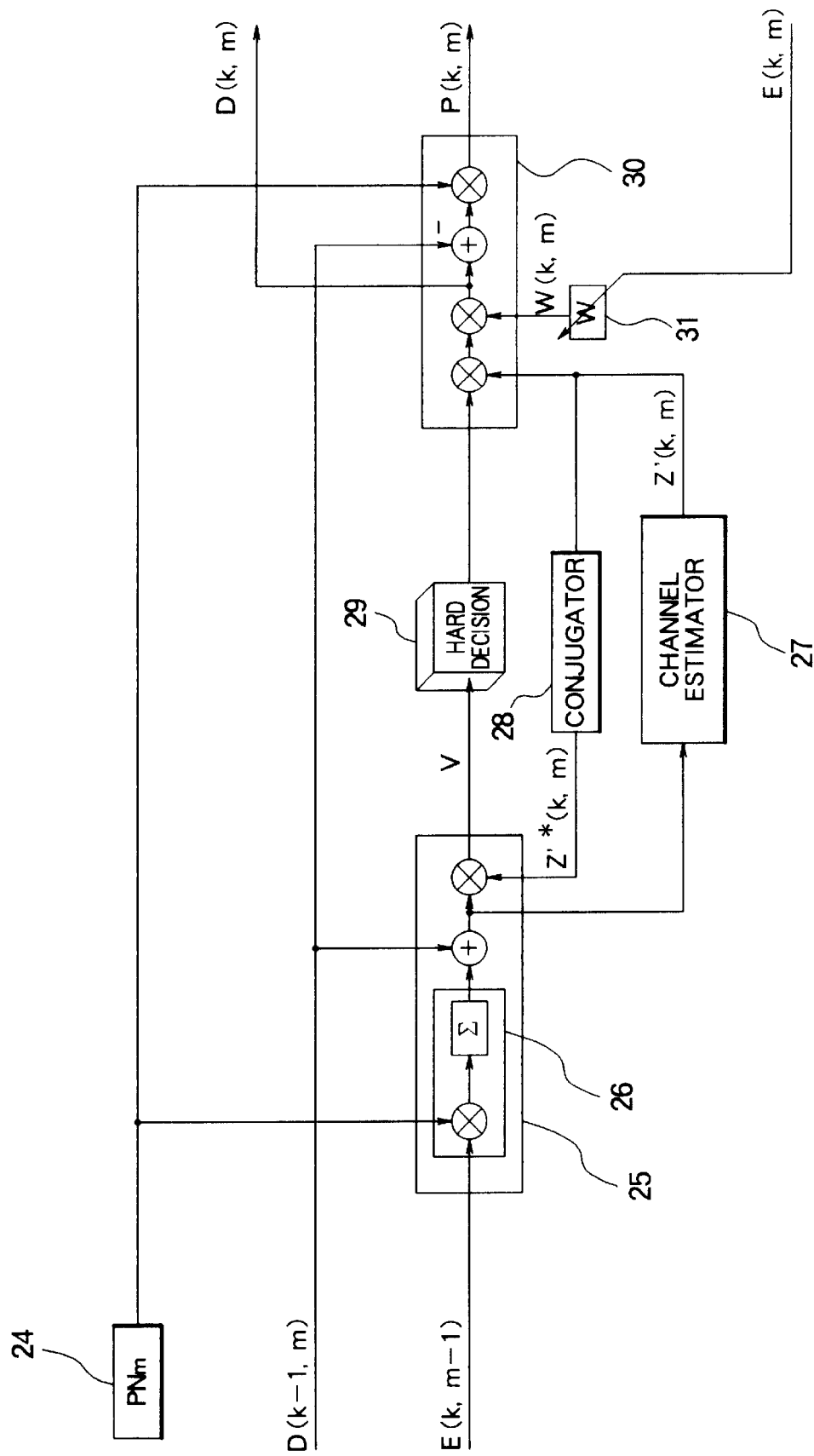
FIG. 3 is a still more detailed block diagram showing the internal structure of the signal estimators in the first and second embodiments of the invention.

Referring to FIG. 1, the first embodiment is a CDMA receiver 10 comprising an antenna 11, a frequency demodulator 12, an interference canceler 13, and a data decoder 14. FIG. 2 shows the internal structure of the interference canceler 13. The interference canceler 13 comprises K stages 21, where K is a positive integer. Each stage 21 comprises M signal estimators 22 and M adders 23, coupled alternately in series as shown, M being an integer greater than one. FIG. 3 shows the internal structure of the m-th signal estimator 22, in the k-th stage 21, where k and m are positive integers not exceeding K and M, respectively. The constituent elements are a spreading-code generator 24, a despreader 25, a correlator 26 internal to the despreader 25, a channel estimator 27, a conjugator 28, a hard-decision unit 29, a respreader 30, and a weighting-factor calculator 31.

The frequency demodulator 12 and data decoder 14 in FIG. 1 comprise well-known circuits, descriptions of which will be omitted. The interference canceler 13 can be configured by interconnecting separate arithmetic and logic circuits as shown in FIGS. 2 and 3, or by providing a general-purpose processor such as a microprocessor or digital signal processor with software for executing the functions of the individual elements shown in FIGS. 2 and 3. Separate signal estimators 22 may be provided as shown in FIG. 2, or a single signal estimator 22 may be provided, the single signal estimator 22 repetitively performing the same process described below for each transmitting station in turn.

Next, the operation will be described.

Referring again to FIG. 1, the antenna 11 receives a combined signal from M transmitting stations. The frequency demodulator 12 filters, amplifies, and demodulates the received signal to obtain a baseband signal r(n). The frequency demodulator 12 includes an analog-to-digital converter (not visible), and outputs the baseband signal r(n) as a digital signal. The interference canceler 13 estimates each transmitting station's symbol values and interference, and subtracts the interference from the received signal. The data decoder 14 performs a decoding process such as a Viterbi convolutional decoding process on the final estimated symbol values to obtain output data.

Referring again to FIG. 2, each signal estimator 22 receives a pair of residual signals Es and generates an estimated symbol value Ds and an estimated interference signal Ps. The numbers in parentheses identify the stage and station to which the signals pertain. For example, Ds(K, M) is the estimate obtained in the K-th stage of the value of the symbol transmitted by the M-th station. The letter "s" indicates that the signal estimators 22 are coupled in series.

The first adder 23 subtracts the first estimated interference signal Ps(1, 1) from the input signal r(n), by adding the negative of Ps(1, 1) to r(n), to obtain a first serial residual signal Es(1, 1). Thereafter, each adder 23 subtracts an estimated interference signal from the preceding residual signal to obtain the next serial residual signal. For example, the last adder 23 subtracts the last estimated interference signal Ps(K, M) from the serially preceding residual signal Es(K, M−1) to obtain the last residual signal Es(K, M).

The received signal r(n), the serial residual signals Es(k, m), and the estimated interference signals Ps(k, m) are all functions of the same time variable (n), even though this is not explicitly indicated for Es(k, m) and Ps(k, m).

The operation of the signal estimators 22 will be described with reference again to FIG. 3, taking the m-th signal estimator 22 in the k-th stage as an example. The letter "s" is omitted from the signal names in FIG. 3, because this drawing also applies to other embodiments, described later, in which the signal estimators 22 are coupled in parallel. In the present embodiment, D(k, m), E(k, m), and P(k, m) in FIG. 3 are the same as Ds(k, m), Es(k, m), and Ps(k, m) in FIG. 2.

The spreading-code generator 24 in FIG. 3 generates the spreading code $PN_m$ assigned to the m-th station. This code $PN_m$ is the same in all K stages. The correlator 26 in the despreader 25 correlates the residual signal E(k, m−1) from the preceding adder 23 with the spreading code $PN_m$, thereby despreading the component of the residual signal that is due to the m-th station. The despreader 25 then adds the estimated symbol value D(k−1, m) from the preceding stage and supplies the result to the channel estimator 27.

As a special case, when m=1, the residual signal from the preceding adder 23 is not E(k, m−1), but is E(k−1, M) if k>1, and is r(n) if k=1. Also, in the first stage (k=1), there is no estimated symbol from the preceding stage; D(0, m) is treated as zero.

The channel estimator 27 uses, for example, a pilot signal inserted into the transmitted signal to obtain an estimate z'(k, m) of the distortion produced in the transmission channel between the m-th transmitting station and the CDMA receiver 10. The conjugator 28 takes the complex conjugate Z'*(k, m) of this estimated distortion. The despreader 25 multiples the sum of the despread residual signal and the preceding estimated symbol value by this complex conjugate Z'*(k, m), thereby producing an estimated symbol value V from which the estimated distortion has been removed, and supplies this estimated symbol value V to the hard-decision unit 29.

The hard-decision unit 29 outputs the coded symbol value that is closest to the estimated value V received from the despreader 25. If the possible symbol values are plus and minus one as mentioned earlier, the hard-decision result will be either plus one or minus one. If another type of code is used, the output of the hard-decision unit 29 may represent, for example, a complex number with an absolute value of one.

The respreader 30 multiples the output of the hard-decision unit 29 by the estimated channel distortion Z'(k, m) and a weighting factor W(k, m) to produce a new estimated symbol value D(k, m), which is output to the next stage. The weighting factor W(k, m) is supplied by the weighting-factor calculator 31. The respreader 30 then subtracts the previous estimated symbol value D(k−1, m) from the new estimated symbol value D(k, m) and respreads the resulting difference by multiplication with the spreading code $PN_m$, thereby producing the estimated interference signal P(k, m).

P(k, m) is an estimate of the m-th station's contribution to the input residual signal E(k, m−1), this contribution being interference from the point of view of the other stations. An adder 23 (shown in FIG. 2) subtracts P(k, m) from E(k, m−1) to cancel this estimated interference, thereby producing the next residual signal E(k, m). As this process is repeated, if all goes well, the power of the residual signal will steadily decrease.

To help ensure that all does go well in this sense, the weighting-factor calculator 31 calculates a weighting factor W(k, m) that tends to minimize the power of the residual signal E(k, m), and adjusts W(k, m) at certain intervals. These intervals are preferably chosen according to the rate of fading of the signal from the m-th transmitting station. For example, the weighting factor can be adjusted at intervals equal to the shortest interval over which significant fading is expected to occur. The optimum W(k, m) can be calculated by applying the well-known least mean square method over an interval of this length, for example.

The signal estimator 22 in FIG. 3, and the adder 23 in FIG. 2 that subtracts P(k, m) from E(k, m−1), can be viewed as a device for transferring signal power from the residual signal E(k, m−1) to the estimated symbol value D(k, m). As the received signal r(n) travels through the interference canceler 13, interference is steadily removed and the estimated symbol values should become increasingly accurate. So should the estimated interference, but as noted above, accurate estimation of the interference P(K, m) is difficult. The adverse effects of inaccurate estimation of interference are mollified, however, by the weighting factors W(k, m). These weighting factors accordingly improve the accuracy of the final estimated symbol values D(K, m) which are delivered to the data decoder 14, thereby reducing the number of errors made in decoding the data.

Figure 4:
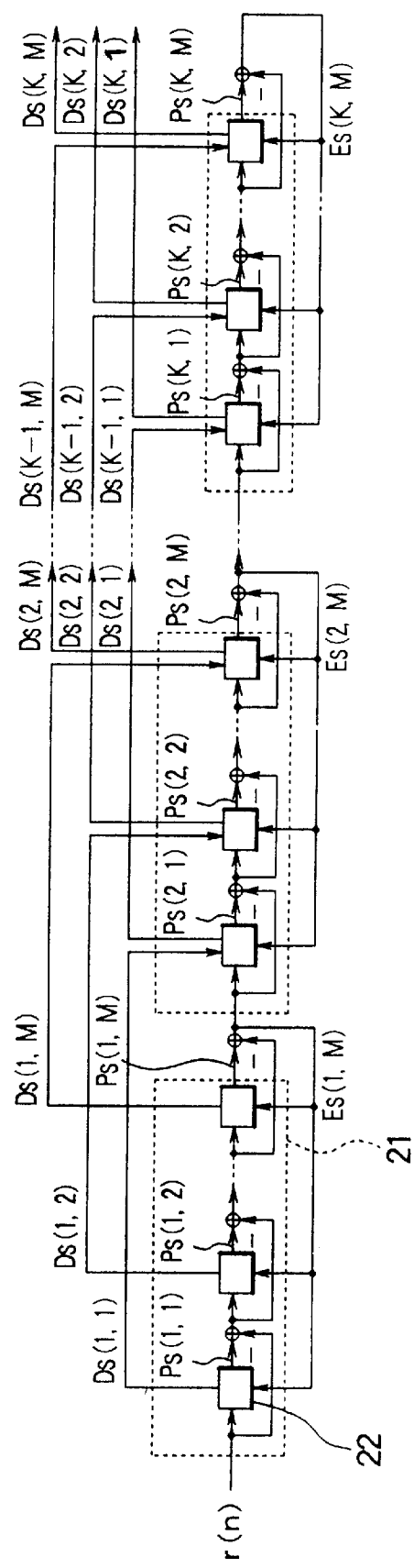
FIG. 4 is a block diagram showing a variation of the internal structure shown in FIG. 2.

FIG. 4 illustrates a variation of the first embodiment in which all of the weighting-factor calculators 31 in the first stage receive the same residual signal Es(1, M), which is the final residual signal output from that stage. The weighting-factor calculators 31 in the individual signal estimators 22 therefore work in concert to reduce the power of Es(1, M), instead of working separately to reduce the power of Es(1, 1), Es(1, 2), . . . , Es(1, M). Similarly, for values of k greater than one, the weighting-factor calculators 31 in the k-th stage all receive Es(k, M), and work in concert to reduce the power of this residual signal.

The weighting in this variation also serves the purpose of reducing the adverse effects of inaccurate estimates of interference. Since all weighting-factor calculators 31 in the same stage cooperate in reducing the power of the same residual signal, however, the power of this signal tends to be reduced more effectively.

Figure 5:
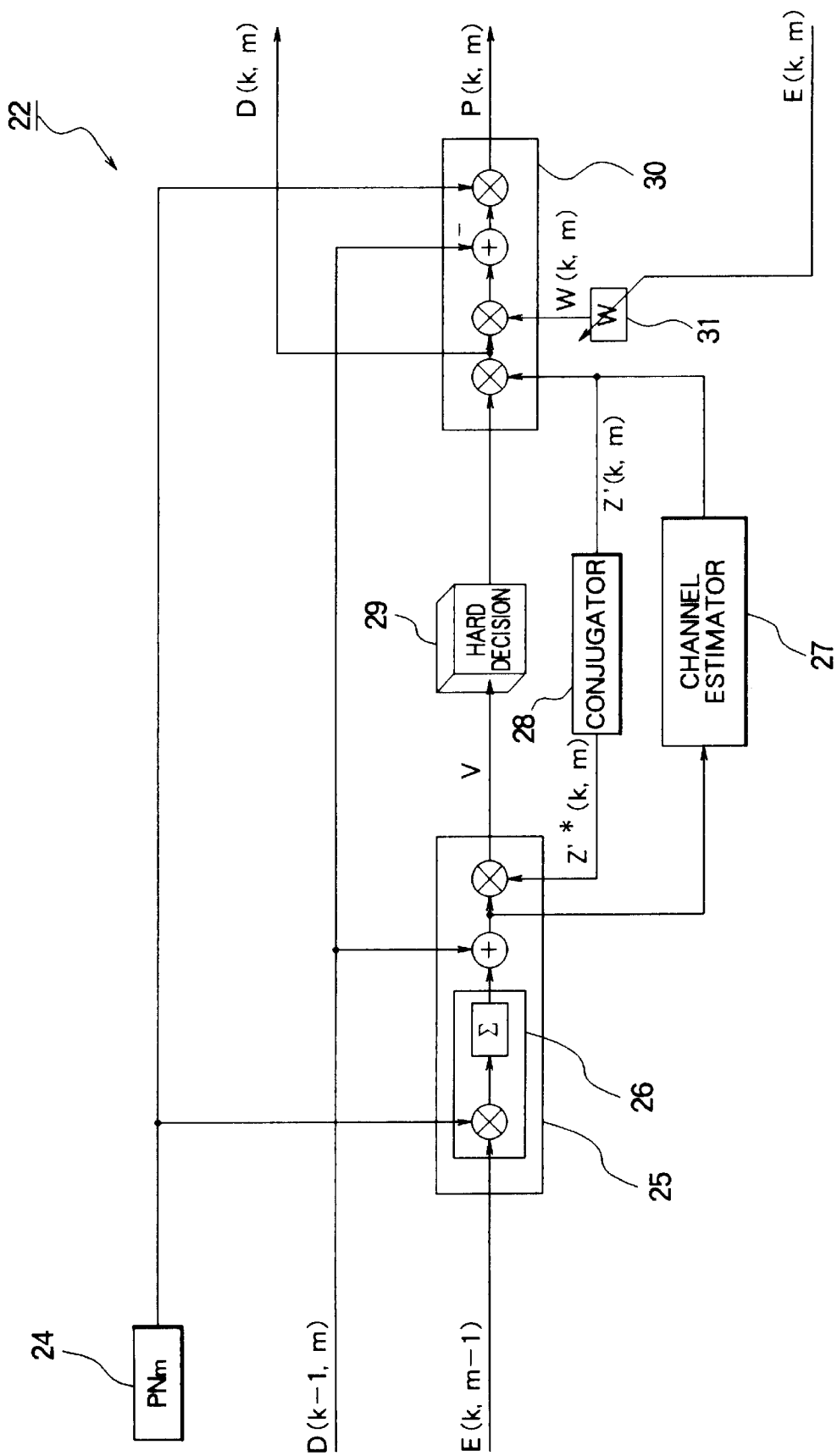
FIG. 5 is a block diagram showing a variation of the internal structure shown in FIG. 3.

FIG. 5 illustrates another variation of the first embodiment, in which the estimated symbol value D(k, m) output by the m-th signal estimator 22 in the k-th stage is not weighted by W(k, m). That is, D(k, m) is equal to the hard-decision value output by the hard-decision unit 29, multiplied by the estimated channel distortion z'(k, m). The weighting factor W(k, m) is applied only in calculating the estimated interference P(K, m). This variation is also expected to reduce the adverse effects of inaccurately estimated interference.

Second Embodiment

Figure 6:
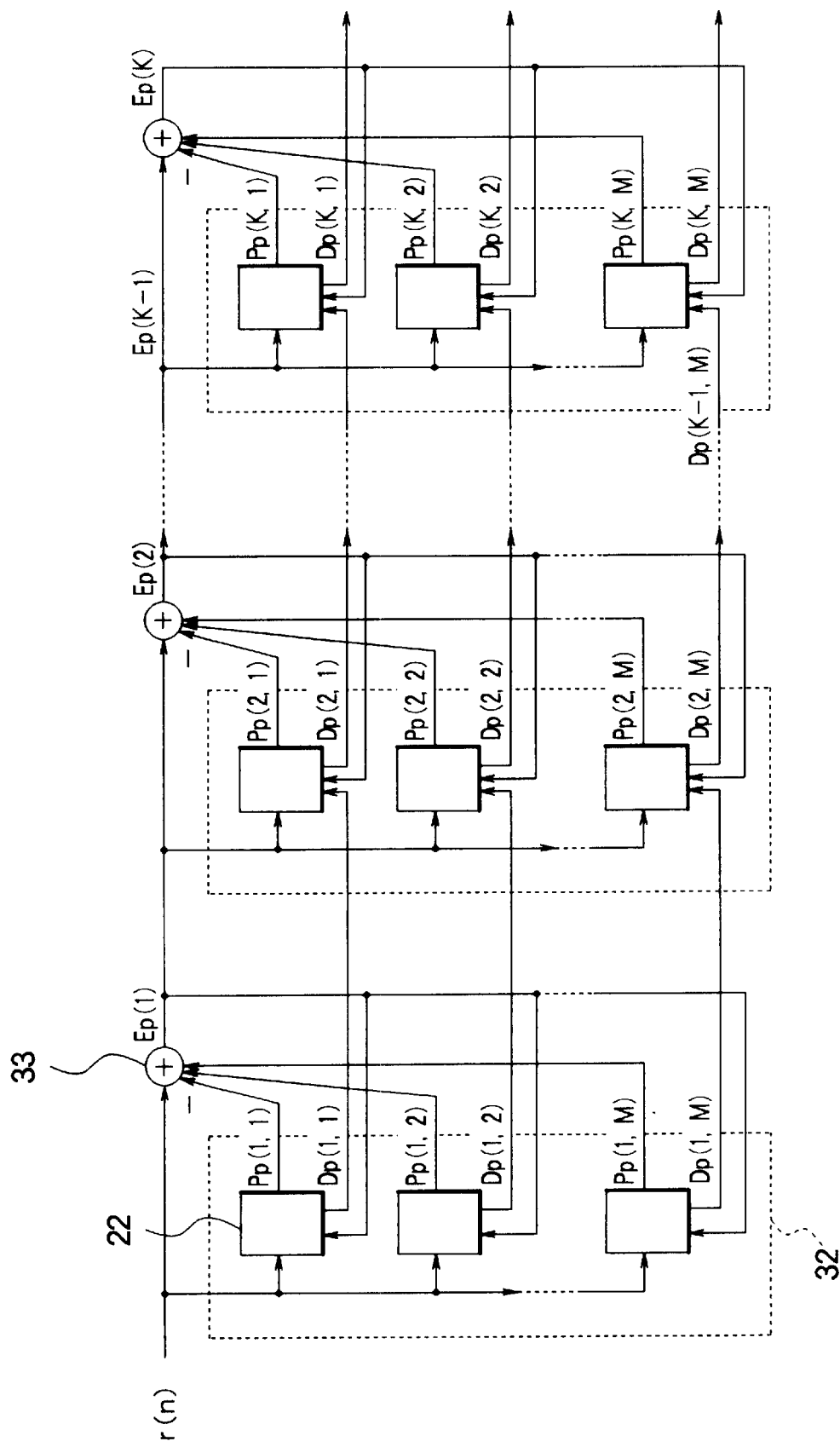
FIG. 6 is a block diagram showing the internal structure of the interference canceler in the second embodiment of the invention.

Referring to FIG. 6, the interference canceler 13 in the second embodiment comprises K stages 32, each with M signal estimators 22 coupled in parallel. The letter "p" is used to identify the signals output by these signal estimators 22, to distinguish these signals from the corresponding signals in the first embodiment.

The received signal r(n) is furnished to all of the signal estimators 22 in the first stage. An adder 33 subtracts the estimated interference signals Pp(1, 1), Pp(1, 2) . . . , Pp(1, M) output by all of the signal estimators 22 in the first stage 31 from the received signal r(n), thereby producing a first residual signal Ep(1), which is furnished to all of the signal estimators 22 in the second stage. The estimated interference signals Pp(2, m) output by the signal estimators 22 in the second stage are all subtracted from Ep(1) to produce a second residual signal Ep(2). This process continues until a final residual signal Ep(K) is obtained.

The internal structure and operation of the signal estimators 22 in the second embodiment is the same as in the first embodiment. Each signal estimator 22 receives the estimated symbol value Dp(k−1, m) from the corresponding signal estimator 22 in the preceding stage, and the residual signal Ep(k−1). These signals were denoted D(k−1, m) and E(k, m−1) in FIG. 2. The weighting-factor calculator 31 in each signal estimator 22 receives the residual signal Ep(k), which was denoted E(k, m) in FIG. 3.

In the second embodiment, the weighting of the estimated interference signals reduces the adverse effect of inaccurate interference estimation to an even greater degree than in the first embodiment. This is partly because the adverse effect was greater to begin with, due to the inaccurate interference estimation inherent in the parallel configuration of the signal estimators 22, but another factor is that all of the weighting-factor calculators 31 in the k-th stage cooperate to minimize the power of the same residual signal Ep(k).

Third Embodiment

Figure 7:
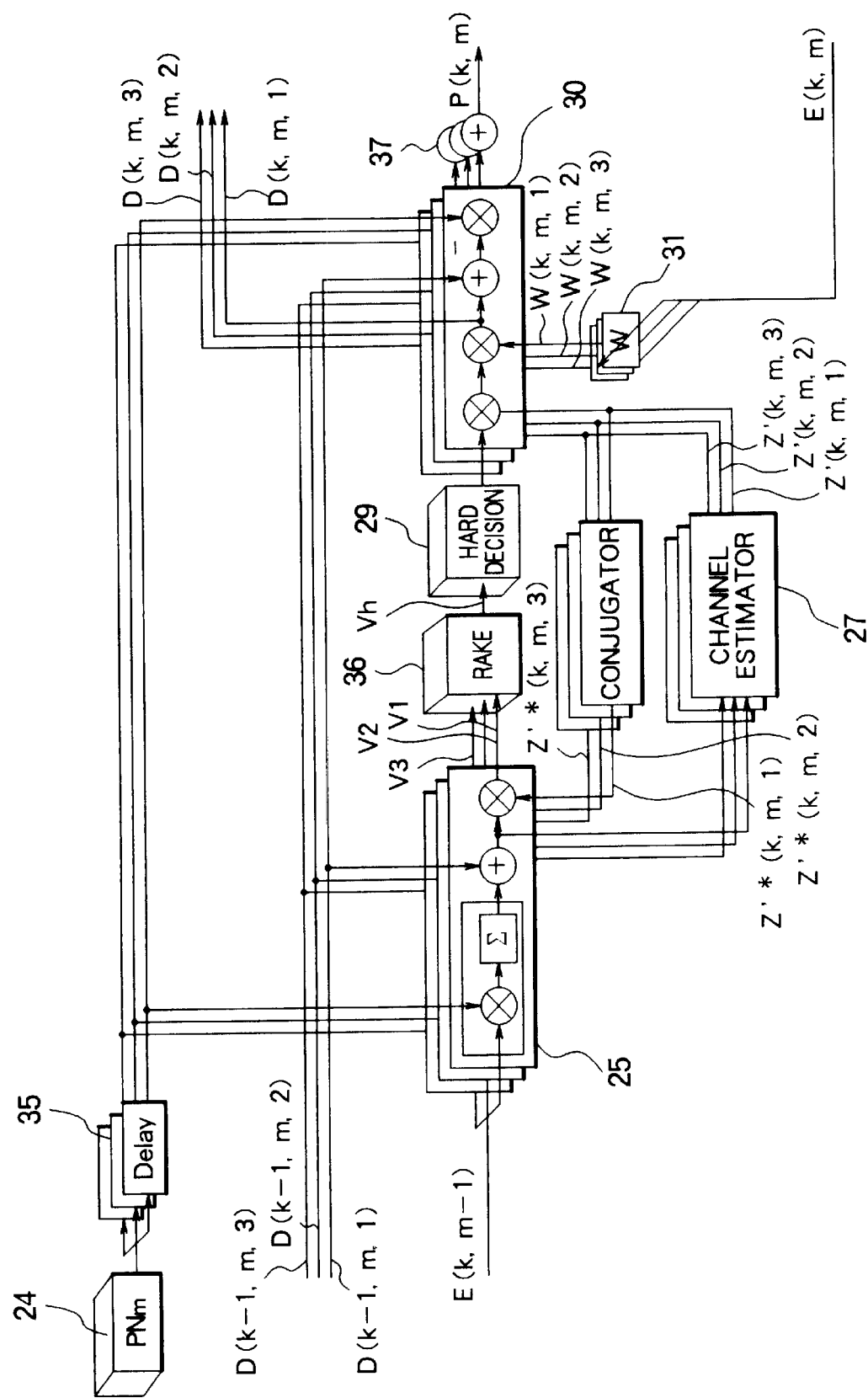
FIG. 7 is a block diagram showing the internal structure of the signal estimators in a third embodiment of the invention.

Referring to FIG. 7, the third embodiment is a Rake receiver that combines the received signal over, in this case, three paths from each transmitting station. The configuration of the signal estimators 22 is accordingly altered as shown in FIG. 7.

Specifically, the spreading code $PN_m$ output by the spreading-code generator 24 is given three different delays by three delay units 35, corresponding to the delays on three presumed signal transmission paths from the m-th station. The three delayed spreading codes are furnished to three despreaders 25 and three respreaders 30, which are coupled to three respective channel estimators 27, three conjugators 28, and three weighting-factor calculators 31. The three despreaders 25 produce three estimated signals V1, V2, and V3, which are provided to a Rake correlator 36. The Rake correlator 36 combines these three signals V1, V2, and V3 in an optimal way by the well-known Rake method, and furnishes the combined signal Vh to the hard-decision unit 29.

The three respreaders 30 produce three estimated interference signals, one for each of the three paths. A path combiner 37 combines (adds) these three signal to produce a single estimated interference signal P(k, m) representing the total interference contributed by the m-th station on all three paths.

Figure 8:
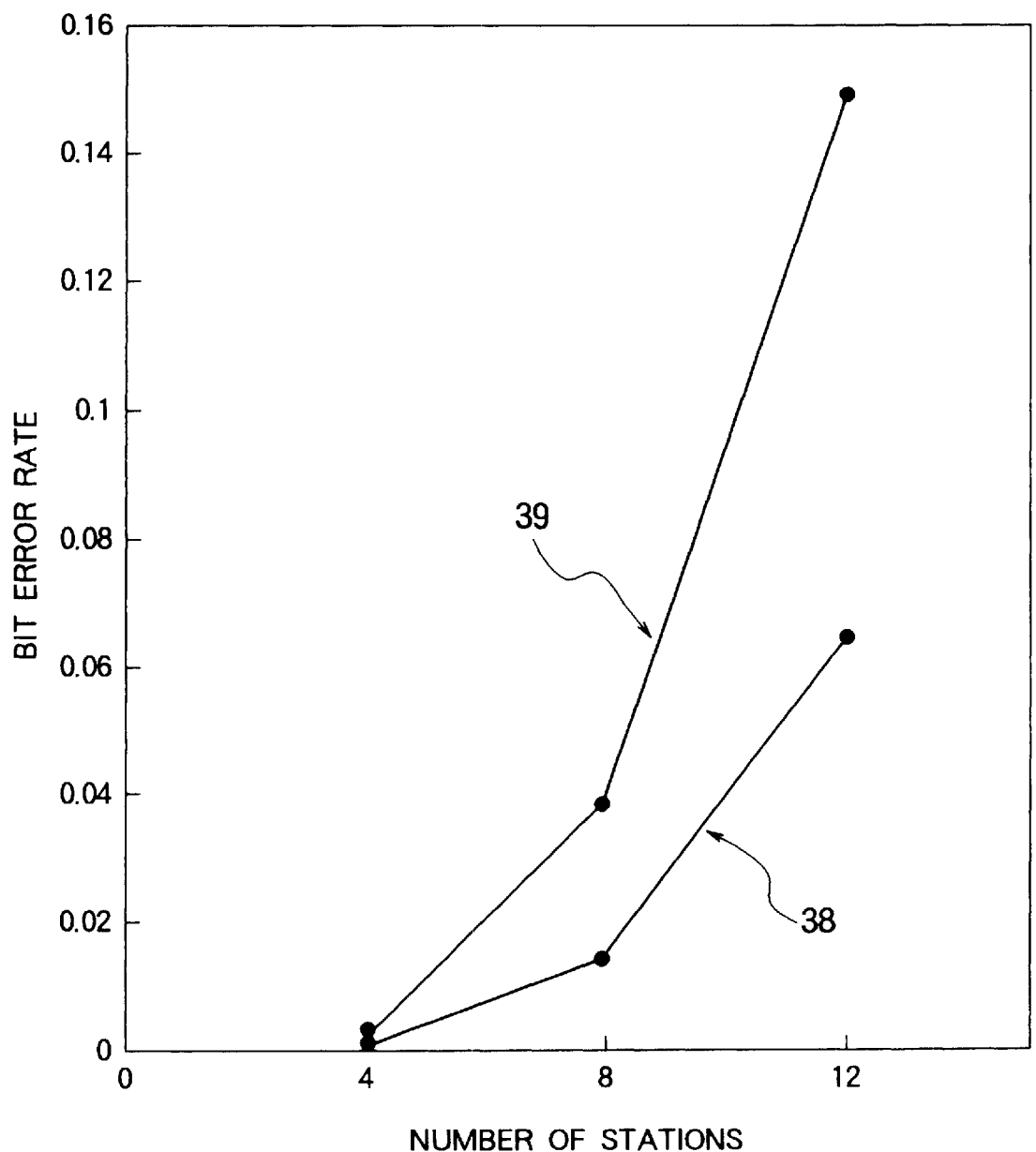
FIG. 8 is a graph illustrating the combined effect of the second and third embodiments.

The path-diversity configuration shown in FIG. 7 can be employed with either the serial interconnection scheme of the first embodiment or the parallel scheme of the second embodiment. FIG. 8 shows an example of the effect when the Rake configuration of FIG. 7 is combined with the parallel interconnection scheme of FIG. 6. The number of transmitting stations (M) is shown on the horizontal axis, and the average bit error rate on the vertical axis.

The data in FIG. 8 were obtained by simulation of the operation of the invented receiver and a conventional receiver. The number of stages (K) was three in both cases. The conventional receiver was identical to the invented receiver, except that it did not use any weighting factors W(k, m). All received signals were assumed to be affected by Rayleigh fading with a maximum Doppler frequency of 40 Hz and equal levels on both waves. Curve 38 is for the conventional receiver; curve 39 is for the invented receiver.

Weighting produced an improvement of 37.7% in the bit error rate with eight transmitting stations, and an improvement of 43.2% with twelve transmitting stations.

Fourth Embodiment

Figure 9:
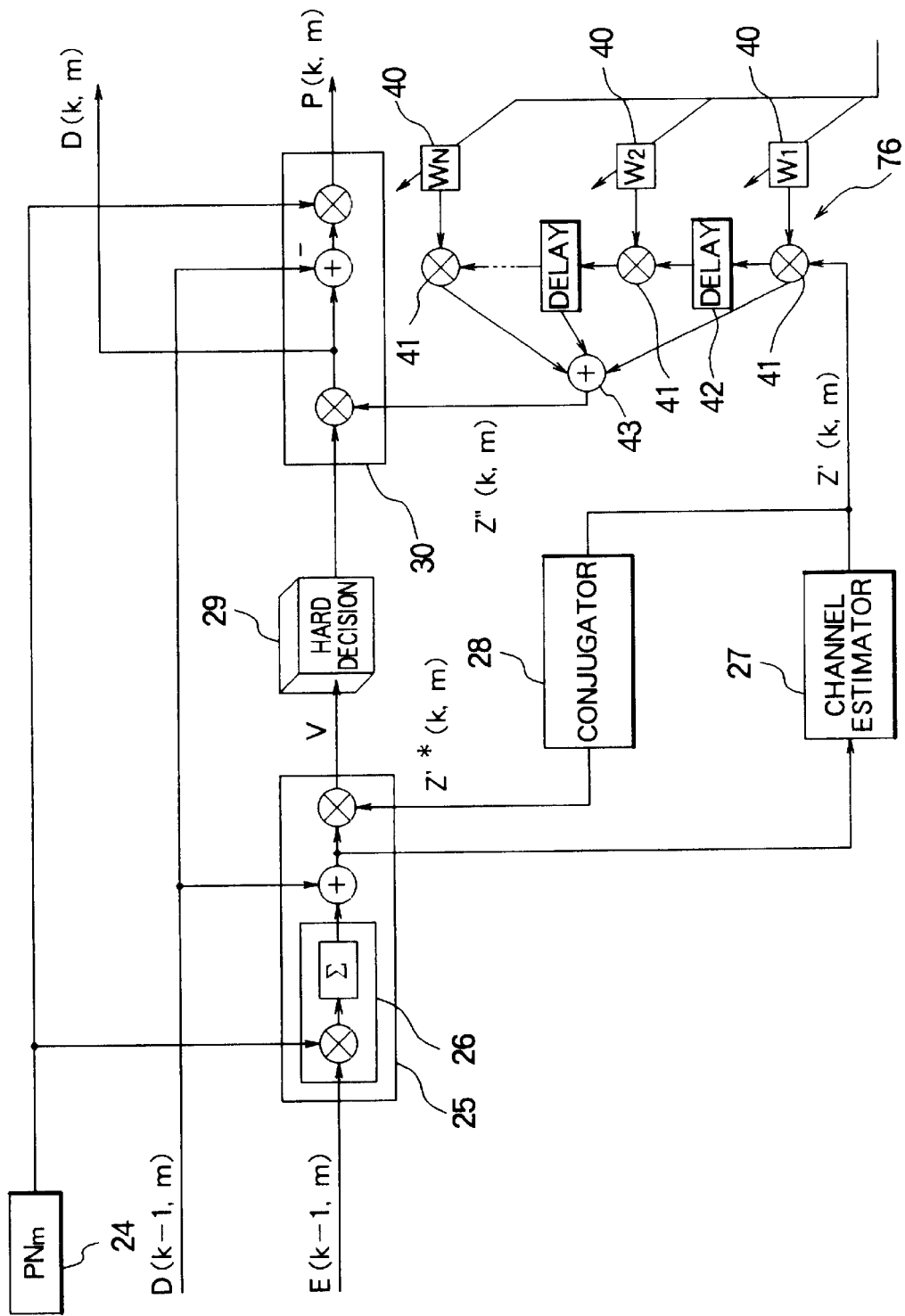
FIG. 9 is a block diagram showing the internal structure of the signal estimators in a fourth embodiment of the invention.

Referring to FIG. 9, the fourth embodiment multiplies the estimated channel distortion z'(k, m) by the weighting factors, instead of supplying weighting factors to the respreader 30.

In this embodiment, instead of a single weighting factor being generated by a single weighting-factor calculator, a set of N weighting factors is generated by a plurality of weighting-factor calculators 40, where N is an arbitrary positive integer. The weighting factors $W_1, W_2, \ldots, W_N$ are supplied to respective multipliers 41, which are coupled in series with delay circuits 42. The estimated channel effect z'(k, m) is fed to the first multiplier. The outputs of the multipliers are added by an adder 43 to produce a weighted estimate of the distortion z"(k, m), which is supplied to the respreader 30. The multipliers 41, delay circuits 42, and adder 43 thus operate as a digital filter that convolves the estimated distortion values z'(k, m) over a certain period of time with a certain number of weighting factors.

The weighting factors $W_1, W_2, \ldots, W_N$ can be calculated by a least mean square method as in the preceding embodiments. Least-squares methods of estimating digital filter coefficients are well known.

The fourth embodiment has substantially the same effect as the first embodiment. In the special case in which N is equal to one, the fourth embodiment has exactly the same effect as the basic variation of the first embodiment, shown in FIG. 3. In this special case (N=1), there is only one multiplier 41, and no delay circuits 42 or adder 43.

Fifth Embodiment

Figure 10:
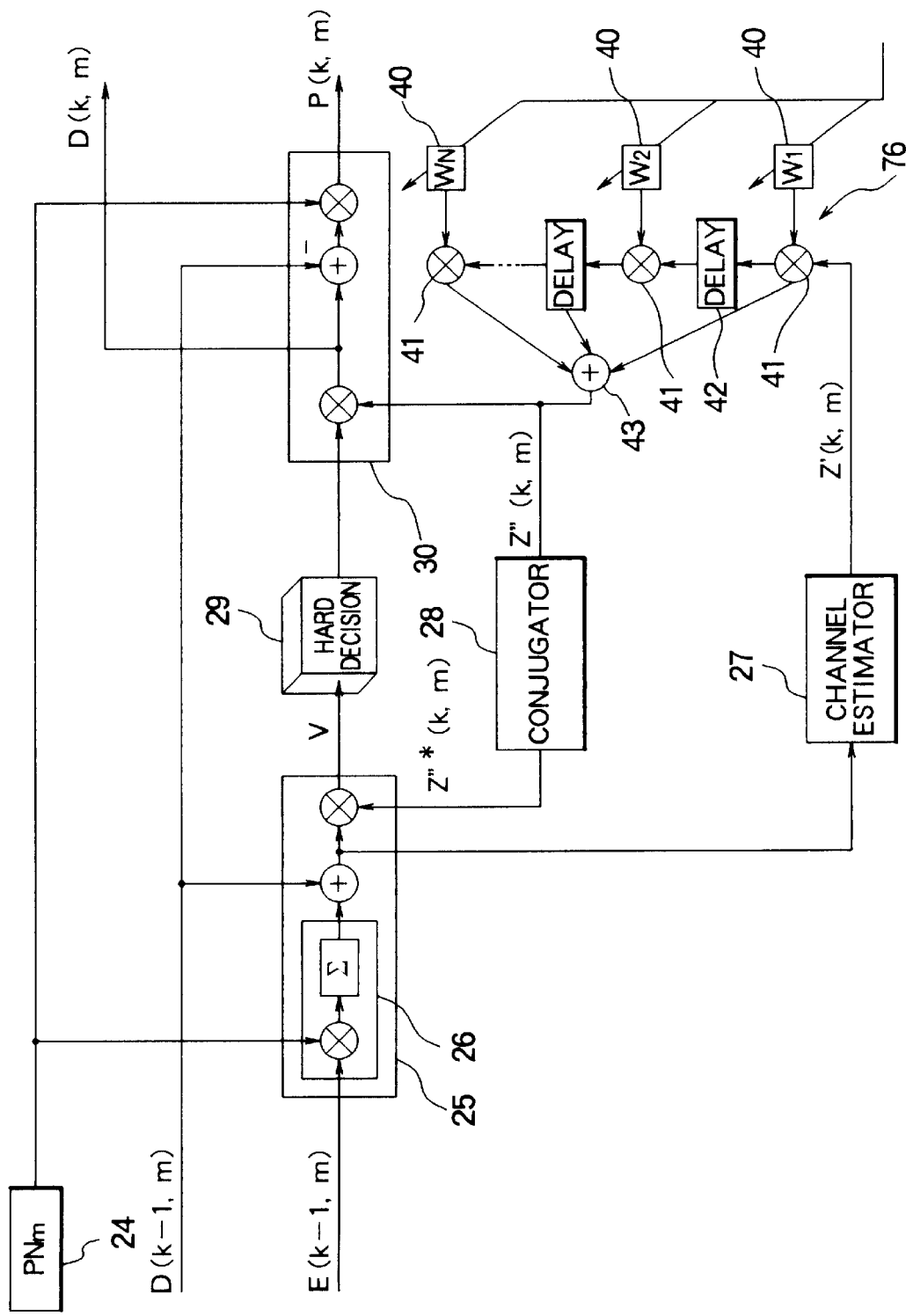
FIG. 10 is a block diagram showing the internal structure of the signal estimators in a fifth embodiment of the invention.

Referring to FIG. 10, the fifth embodiment is similar to the fourth embodiment, except that the weighted estimate of the distortion z"(k, m) is also supplied to the conjugator 28, which furnishes the corresponding complex conjugate z"*(k, m) to the despreader 25. Use of the weighted estimate of the distortion, instead of the unweighted estimate z'(k, m), may improve the accuracy of the estimated symbol value V.

Sixth Embodiment

Figure 11:
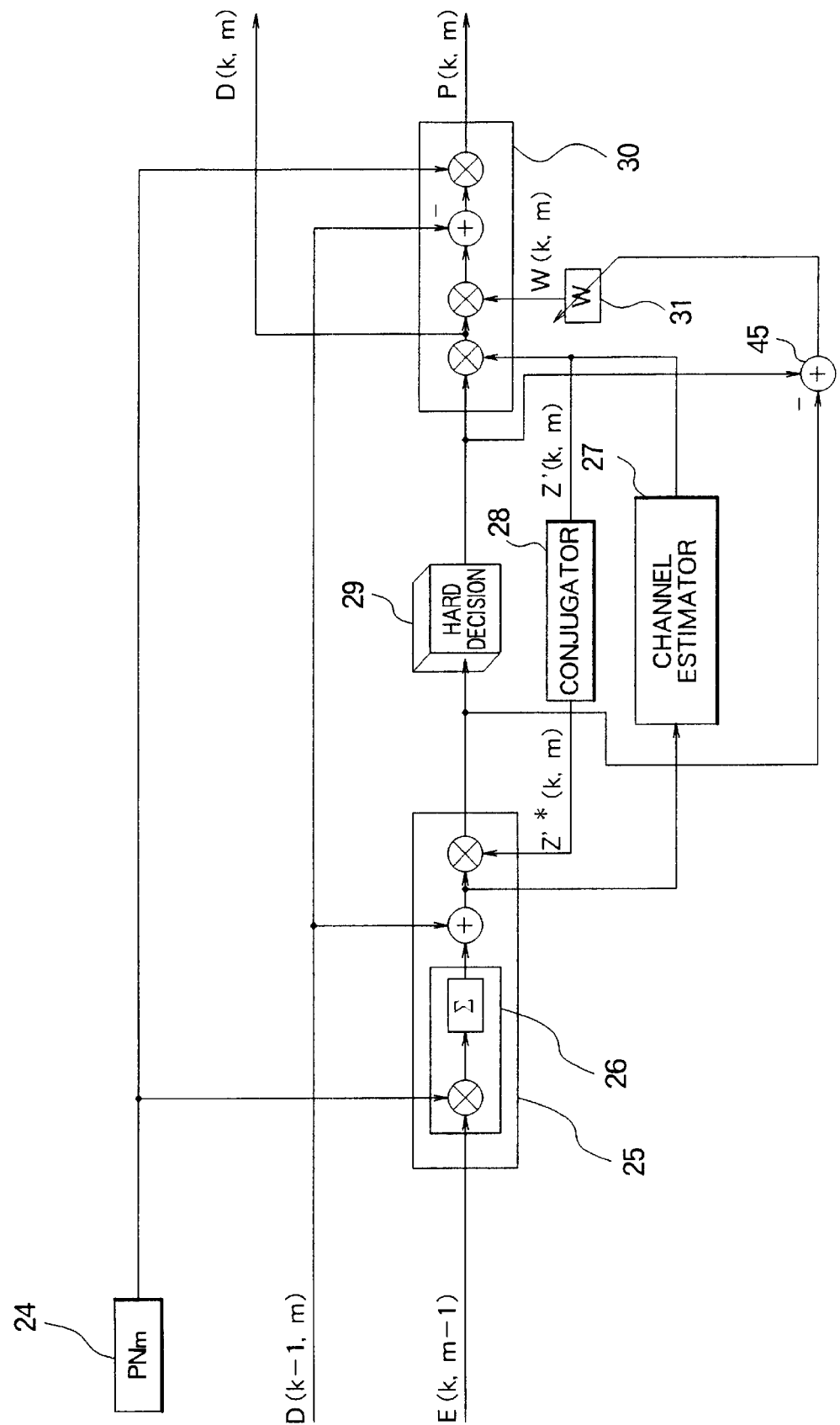
FIG. 11 is a block diagram showing the internal structure of the signal estimators in a sixth embodiment of the invention.

Referring to FIG. 11, the sixth embodiment differs from the first embodiment in that the weighting-factor calculator 31 estimates the weighting factor W(k, m) from the difference between the estimated symbol value V and the symbol value output by the hard-decision unit 29. This difference is obtained by an adder 45 that subtracts V from the hard decision result. If the estimated symbol values V differ from the hard decision results in a consistent manner over a certain interval, the weighting-factor calculator 31 adjusts the weighting factor W(k, m) according to the difference.

The sixth embodiment also improves the accuracy of the estimated interference values P(k, m) and reduces the power of the residual signal E(k, m), without requiring feedback of the residual signal to the weighting-factor calculator 31.

All of the embodiments and variations described above employ the same basic concept of observing the residual signals (or the difference between the estimated symbol values before and after the hard decision), estimating weighting factors that tend to minimize the power of the residual signal, and weighting the estimated symbol values, or weighting the estimated channel distortions and therefore also the estimated symbol values, with the estimated weighting factors. This weighting lessens the inaccuracy of the estimated interference values P(k, m). The overall effect is a reduced bit error rate, as illustrated in FIG. 8.

Since the weighting factors can compensate for fading, the present invention is particularly suited for use in mobile communication systems, where fading is an ever-present problems. The invented receiver can be employed in both base-station equipment and mobile-station equipment in such mobile communication systems. The usefulness of the invention is not limited to mobile communication systems, however; the invention can be practiced in any CDMA system in which co-channel interference occurs.

The invention is not limited to the circuit configurations and interconnections shown in the embodiments above. For example, the number of assumed paths in the third embodiment is not limited to three. In the fourth and fifth embodiments, various digital filter configurations are possible other than the configuration illustrated in FIGS. 9 and 10.

Since P(k, m) is a function of the same time variable (n) as the received signal r(n), the weighting factor W(k, m) in the first embodiment does not have to be a single numerical value; W(k, m) can be a set of digital filter coefficients, making the weighting operation into a digital filtering operation, similar to the operation illustrated in the fourth and fifth embodiments. In the fourth and fifth embodiments, a plurality of weighting factors were convolved with the estimated distortion over a certain interval of time; in the first embodiment, a plurality of weighting factors can be convolved with the estimated symbol values over a certain period of time.

Those skilled in the art will recognize that further modifications are possible within the scope claimed below.

What is claimed is:

1. An improved method of canceling co-channel interference in a code division multiple access (CDMA) receiver that obtains a received signal in which signals transmitted by a plurality of stations are present, despreads the received signal, thereby obtaining estimated symbol values transmitted by each of said stations, respreads the estimated symbol values, thereby obtaining estimated interference transmitted by each of said stations, and subtracts the estimated interference from the received signal, thereby obtaining a residual signal, the improvement comprising the steps of:

calculating at least one weighting factor separately and independently for each respective station among said stations;

multiplying the symbol values estimated to have been transmitted by each said station by the respective at least one weighting factor calculated for said each station when said estimated symbol values are respread, to minimize said residual signal; and adjusting said weighting factors at certain intervals.

2. The method of claim 1, wherein the intervals at which said weighting factors are adjusted are determined according to a rate of fading of said received signal.

3. The method of claim 1, wherein the estimated symbol values for all said stations are obtained in parallel, and the estimated interference of all said stations is subtracted simultaneously from said received signal.

4. The method of claim 1, wherein said estimated symbol values are multiplied by said weighting factors before said estimated symbol values are respread.

5. An improved method of canceling interference in a code division multiple access (CDMA) receiver that obtains a received signal in which signals transmitted by a plurality of stations are present, despreads the received signal, thereby obtains estimated values transmitted by each of said stations, respreads the estimated symbol values, thereby obtains estimated interference transmitted by each of said stations, and subtracts the estimated interference from the received signal, the improvement comprising the steps of:

calculating at least one weighting factor separately and independently for each respective station among said stations;

multiplying said estimated symbol values by respective weighting factors; and adjusting said weighting factors at certain intervals, wherein the estimated symbol values for different stations among said stations are obtained in series, the estimated interference of each stations being subtracted from said received signal before the estimated symbol values of remaining stations among said stations are obtained.

6. The method of claim 5, wherein the weighting factors for each station among said stations are calculated from a serial residual signal left immediately after the estimated interference due to said station has been subtracted.

7. The method of claim 6, wherein said weighting factors are calculated by applying a least mean square method to said residual signal.

8. The method of claim 5, wherein said weighting factors are calculated from a residual signal left after all stations' estimated interference has been subtracted from said received signal.

9. The method of claim 8, wherein said weighting factors are calculated by applying a least mean square method to said residual signal.

10. An improved method of canceling interference in a code division multiple access (CDMA) receiver that obtains a received signal in which signals transmitted by a plurality of stations are present, despreads the received signal, thereby obtains estimated values transmitted by each of said stations, respreads the estimated symbol values, thereby obtains estimated interference transmitted by each of said stations, and subtracts the estimated interference from the received signal, the improvement comprising the steps of:

calculating at least one weighting factor for each station among said stations;

multiplying said estimated symbol values by respective weighting factors; and adjusting said weighting factors at certain intervals, wherein said estimated symbol values are obtained by making a hard decision after despreading, and said weighting factors are calculated from a difference between the estimated symbol values after said hard decision and the estimated symbol values after despreading but before hard decision.

11. An improved method of canceling interference in a code division multiple access (CDMA) receiver that obtains a received signal in which signals transmitted by a plurality of stations are present, despreads the received signal, thereby obtains estimated values transmitted by each of said stations, respreads the estimated symbol values, thereby obtains estimated interference transmitted by each of said stations, and subtracts the estimated interference from the received signal, the improvement comprising the steps of:

calculating at least one weighting factor for each station among said stations;

multiplying said estimated symbol values by respective weighting factors; and adjusting said weighting factors at certain intervals, wherein a plurality of weighting factors are calculated for each said station, and in said step of multiplying, for each said station, the estimated symbol values of said station over a certain period of time are convolved with said plurality of weighting factors.

12. An improved method of canceling interference in a code division multiple access (CDMA) receiver that obtains a received signal in which signals transmitted by a plurality of stations are present, despreads the received signal, thereby obtains estimated values transmitted by each of said stations, respreads the estimated symbol values, thereby obtains estimated interference transmitted by each of said stations, and subtracts the estimated interference from the received signal, the improvement comprising the steps of:

calculating at least one weighting factor for each station among said stations;

multiplying said estimated symbol values by respective weighting factors; and adjusting said weighting factors at certain intervals, wherein:

said estimated symbol values are obtained by assuming different paths from each said station, obtaining separate estimated symbol values for the different paths, and combining said separate estimated symbol values to obtain a single estimated symbol value;

said weighting factors are calculated separately for each path among said different paths; and said estimated interference is obtained separately for each path among said different paths.

13. An improved method of canceling interference in a code division multiple access (CDMA) receiver that obtains a received signal in which signals transmitted by a plurality of stations are present, despreads the received signal, thereby obtains estimated values transmitted by each of said stations, respreads the estimated symbol values, thereby obtains estimated interference transmitted by each of said stations, and subtracts the estimated interference from the received signal, the improvement comprising the steps of:

calculating at least one weighting factor for each station among said stations;

multiplying said estimated symbol values by respective weighting factors; and adjusting said weighting factors at certain intervals;

determining an estimated distortion for each said station;

removing said estimated distortion when said estimated symbol values obtained; and re-including said estimated distortion when said estimated interference is obtained.

14. The method of claim 11, wherein the step of multiplying in claim 1 is carried out on said estimated distortion, thereby indirectly multiplying said estimated symbol values by respective weighting factors.

15. The method of claim 14, wherein said estimated distortion is also weighted by multiplication by a respective weighting factor when used in obtaining said estimated symbol values.

16. An improved method of canceling interference in a code division multiple access (CDMA) receiver that obtains a received signal in which signals transmitted by a plurality of stations are present, despreads the received signal, thereby obtains estimated values transmitted by each of said stations, respreads the estimated symbol values, thereby obtains estimated interference transmitted by each of said stations, and subtracts the estimated interference from the received signal, the improvement comprising the steps of:

calculating at least one weighting factor for each station among said stations;

multiplying said estimated symbol values by respective weighting factors; and adjusting said weighting factors at certain intervals, wherein the estimated symbol values for all said stations are obtained in parallel, and the estimated interference of all said stations is subtracted simultaneously from said received signal, wherein said estimated distortion is not weighted by multiplication by a respective weighting factor when used in obtaining said estimated symbol values.

17. An improved method of canceling interference in a code division multiple access (CDMA) receiver that obtains a received signal in which signals transmitted by a plurality of stations are present, despreads the received signal, thereby obtains estimated values transmitted by each of said stations, respreads the estimated symbol values, thereby obtains estimated interference transmitted by each of said stations, and subtracts the estimated interference from the received signal, the improvement comprising the steps of:

calculating at least one weighting factor for each station among said stations;

multiplying said estimated symbol values by respective weighting factors; and adjusting said weighting factors at certain intervals, wherein, after said method has been applied in a first stage to obtain estimated symbol values and estimated interference for all of said stations, and all said estimated interference has been subtracted from said received signal to obtain an output residual signal, said method is applied in at least one additional stage, each said additional state receiving the output residual signal from an immediately preceding stage in place of said received signal.

18. An improved code division multiple access receiver of the type having at least one despreader that despreads a received signal in which signals transmitted by a plurality of stations are present, thereby obtaining estimated symbol values, at least one respreader that respreads the estimated symbol values, thereby obtaining estimated interference, and at least one adder that subtracts the estimated interference from the received signal, thereby obtaining a residual signal, comprising:

at least one weighting-factor calculator coupled to said respreader, for separately and independently calculating at least one respective weighting factor for each of said stations and adjusting said at least one respective weighting factor for each of said stations at certain intervals, said estimated symbol values being multiplied by the respective weighting factors, to minimize said residual signal when said estimated interference is obtained.

19. The receiver of claim 18, wherein the interval at which said weighting-factor calculator adjusts said weighting factor is determined according to a rate of fading of said received signal.

20. The receiver of claim 18, wherein the estimated symbol values for all said stations are obtained in parallel, and the estimated interference of all said stations is subtracted simultaneously from said received signal.

21. An improved code division multiple access receiver of the type having at least one despreader that despreads a received signal in which signals transmitted by a plurality of stations are present, thereby obtaining estimated symbol values, at least one respreader that respreads the estimated symbol values, thereby obtaining estimated interference, and at least one adder that subtracts the estimated interference from the received signal, comprising:

at least one weighting-factor calculator coupled to said respreader, for separately and independently calculating at least one weighting factor for each of said stations and respectively adjusting said at least one weighting factor at certain intervals, said estimated symbol values being multiplied by respective weighting factors when said estimated interference is obtained, wherein the estimated symbol values for different stations among said stations are obtained in series, the estimated interference of each station being subtracted from said received signal before the estimated symbol values of remaining stations among said stations are obtained.

22. The receiver of claim 21, wherein the weighting factors for each station among said stations are calculated from a serial residual signal left immediately after the estimated interference due to said station has been subtracted.

23. The receiver of claim 22, wherein said weighting factors are calculated by applying a least mean square method to said residual signal.

24. The receiver of claim 21, wherein said weighting factors are calculated from a residual signal left after all stations' estimated interference has been subtracted from said received signal.

25. The receiver of claim 24, wherein said weighting factors are calculated by applying a least mean square method to said residual signal.

26. The receiver of claim 21, wherein said estimated symbol values are multiplied by said weighting factors before said estimated symbol values are respread.

27. An improved code division multiple access receiver of the type having at least one despreader that despreads a received signal in which signals transmitted by a plurality of stations are present, thereby obtaining estimated symbol values, at least one respreader that respreads the estimated symbol values, thereby obtaining estimated interference, and at least one adder that subtracts the estimated interference from the received signal, comprising:

at least one weighting-factor calculator coupled to said respreader, for separately calculating at least one weighting factor for each of said station and adjusting said weighting factor at certain intervals, said estimated symbol values being multiplied by respective weighting factors when said estimated interference is obtained, a hard-decision unit for making a hard decision on said estimated symbol values after despreading, wherein said weighting-factor calculator calculates said weighting factor from a difference between the estimated symbol values after said hard decision and the estimated symbol values after despreading but before said hard decision.

28. An improved code division multiple access receiver of the type having at least one despreader that despreads a received signal in which signals transmitted by a plurality of stations are present, thereby obtaining estimated symbol values, at least one respreader that respreads the estimated symbol values, thereby obtaining estimated interference, and at least one adder that subtracts the estimated interference from the received signal, comprising:

at least one weighting-factor calculator coupled to said respreader, for separately calculating at least one weighting factor for each of said station and adjusting said weighting factor at certain intervals, said estimated symbol values being multiplied by respective weighting factors when said estimated interference is obtained, wherein a plurality of weighting factors are calculated for each said station, and said respreader convolves the estimated symbol values of said station over a certain period of time with said plurality of weighting factors.

29. An improved code division multiple access receiver of the type having at least one despreader that despreads a received signal in which signals transmitted by a plurality of stations are present, thereby obtaining estimated symbol values, at least one respreader that respreads the estimated symbol values, thereby obtaining estimated interference, and at least one adder that subtracts the estimated interference from the received signal, comprising:

at least one weighting-factor calculator coupled to said respreader, for separately calculating at least one weighting factor for each of said station and adjusting said weighting factor at certain intervals, said estimated symbol values being multiplied by respective weighting factors when said estimated interference is obtained, wherein:

said estimated symbol values are obtained by assuming different paths from each said station , obtaining separate estimated symbol values for the different paths, and combining said separate estimated symbol values to obtain a single estimated symbol value;

said weighting factors are calculated separately for each path among said different paths; and said estimated interference is obtained separately for each path among said different paths.

30. An improved code division multiple access receiver of the type having at least one despreader that despreads a received signal in which signals transmitted by a plurality of stations are present, thereby obtaining estimated symbol values, at least one respreader that respreads the estimated symbol values, thereby obtaining estimated interference, and at least one adder that subtracts the estimated interference from the received signal, comprising:

at least one weighting-factor calculator coupled to said respreader, for separately calculating at least one weighting factor for each of said station and adjusting said weighting factor at certain intervals, said estimated symbol values being multiplied by respective weighting factors when said estimated interference is obtained;

at least one channel estimator for determining an estimated distortion, said estimated distortion being removed when said estimated symbol values are obtained, and said estimated distortion being re-included when said estimated interference is obtained.

31. The receiver of claim 30, wherein said estimated distortion is multiplied by a respective weighting factor produced by said weighting-factor calculator, thereby indirectly multiplying said estimated symbol values by respective weighting factors.

32. The receiver of claim 31, wherein said estimated distortion is not weighted by multiplication by a respective weighting factor when used in obtaining said estimated symbol values.

33. The receiver of claim 31, wherein said estimated distortion is also weighted by multiplication by a respective weighting factor when used in obtaining said estimated symbol values.

34. An improved code division multiple access receiver of the type having at least one despreader that despreads a received signal in which signals transmitted by a plurality of stations are present, thereby obtaining estimated symbol values, at least one respreader that respreads the estimated symbol values, thereby obtaining estimated interference, and at least one adder that subtracts the estimated interference from the received signal, comprising:

at least one weighting-factor calculator coupled to said respreader, for separately calculating at least one weighting factor for each of said station and adjusting said weighting factor at certain intervals, said estimated symbol values being multiplied by respective weighting factors when said estimated interference is obtained, wherein, after said receiver has obtained estimated symbol values and estimated interference for all of said stations in a first stage of operation, and all said estimated interference has been subtracted from said received signal to obtain an output residual signal, said receiver carries out at least one additional stage of despreading, estimating symbol values and interference, and subtracting the estimated interference as described in claim 17, each said additional stage receiving the output residual signal from an immediately preceding stage in place of said received signal.

35. An improved method of canceling interference in a code division multiple access (CDMA) receiver that obtains a received signal in which signals transmitted by a plurality of stations are present, despreads the received signal, thereby obtains estimated values transmitted by each of said stations, respreads the estimated symbol values, thereby obtains estimated interferences transmitted by each of said stations, and subtracts the estimated interference from the received signal, the improvement comprising the steps of:

calculating at least one weighting factor for each station among said stations;

multiplying said estimated symbol values by respective weighting factors; and adjusting said weighting factors at certain intervals, wherein the estimated symbol values for different stations among said stations are obtained in series, the estimated interference of each stations being subtracted from said received signal before the estimated symbol values of remaining stations among said stations are obtained, wherein the weighting factors for each station among said stations are calculated from a serial residual signal left immediately after the estimated interference due to said station has been subtracted, and wherein said weighting factors are calculated for minimum power of said serial residual signal.

36. An improved method of canceling interference in a code division multiple access (CDMA) receiver that obtains a received signal in which signals transmitted by a plurality of stations are present, despreads the received signal, thereby obtains estimated values transmitted by each of said stations, respreads the estimated symbol values, thereby obtains estimated interferences transmitted by each of said stations, and subtracts the estimated interference from the received signal, the improvement comprising the steps of:

calculating at least one weighting factor for each station among said stations;

multiplying said estimated symbol values by respective weighting factors; and adjusting said weighting factors at certain intervals,
wherein the estimated symbol values for different stations among said stations are obtained in series, the estimated interference of each stations being subtracted from said received signal before the estimated symbol values of remaining stations among said stations are obtained,
wherein said weighting factors are calculated from a residual signal left after all stations' estimated interference has been subtracted from said received signal, and
wherein said weighting factors are calculated for minimum power of said residual signal.

37. An improved code division multiple access receiver of the type having at least one despreader that despreads a received signal in which signals transmitted by a plurality of stations are present, thereby obtaining estimated symbol values, at least one respreader that respreads the estimated symbol values, thereby obtaining estimated interference, and at least one adder that subtracts the estimated interference from the received signal, comprising:
at least one weighting-factor calculator coupled to said respreader, for separately calculating at least one weighting factor for each of said station and adjusting said weighting factor at certain intervals, said estimated symbol values being multiplied by respective weighting factors when said estimated interference is obtained,
wherein the estimated symbol values for different stations among said stations are obtained in series, the estimated interference of each station being subtracted from said received signal before the estimated symbol values of remaining stations among said stations are obtained,
wherein the weighting factors for each station among said stations are calculated from a serial residual signal left immediately after the estimated interference due to said station has been subtracted, and
wherein said weighting factors are calculated for minimum power of said serial residual signal.

38. An improved code division multiple access receiver of the type having at least one despreader that despreads a received signal in which signals transmitted by a plurality of stations are present, thereby obtaining estimated symbol values, at least one respreader that respreads the estimated symbol values, thereby obtaining estimated interference, and at least one adder that subtracts the estimated interference from the received signal, comprising:
at least one weighting-factor calculator coupled to said respreader, for separately calculating at least one weighting factor for each of said station and adjusting said weighting factor at certain intervals, said estimated symbol values being multiplied by respective weighting factors when said estimated interference is obtained,
wherein the estimated symbol values for different stations among said stations are obtained in series, the estimated interference of each station being subtracted from said received signal before the estimated symbol values of remaining stations among said stations are obtained,
wherein said weighting factors are calculated from a residual signal left after all stations' estimated interference has been subtracted from said received signal, and
wherein said weighting factors are calculated for minimum power of said residual signal.

39. A method of canceling interference in a code division multiple access receiver, comprising:
despreading a received signal obtained from signals transmitted by a plurality of stations, to obtain estimated symbol values of the signals transmitted from the stations;
calculating at least one weighting factor separately and independently for each respective station among the stations;
estimating interference transmitted by each of the stations, including weighting and respreading the estimated symbol values, said weighting including multiplying the estimated symbol values by the respective weighting factors;
subtracting the estimated interference from the received signal, thereby obtaining a residual signal; and
adjusting the weighting factors at certain intervals so as to minimize the residual signal.

40. A method of canceling interference in a code division multiple access receiver, comprising:
despreading a received signal obtained from signals transmitted by a plurality of stations, to obtain estimated symbol values of the signals transmitted from the stations;
calculating at least one weighting factor, separately and independently for each respective station among the stations;
estimating interference transmitted by each of the stations, including weighting and respreading the estimated symbol values, said weighting including multiplying the estimated symbol values by the respective weighting factors;
subtracting the estimated interference from the received signal, thereby obtaining a residual signal; and
adjusting the weighting factors at certain intervals so as to minimize the residual signal,
wherein said step of weighting the estimated symbol values includes weighting the estimated symbols before said respreading the estimated symbol values.

41. A method of canceling interference in a code division multiple access receiver, comprising:
despreading a received signal obtained from signals transmitted by a plurality of stations, to obtain estimated symbol values of the signals transmitted from the stations;
calculating at least one weighting factor, separately and independently for each station among the stations;
estimating interference transmitted by each of the stations, including weighting and respreading the estimated symbol values, said weighting including multiplying the estimated symbol values by the respective weighting factors;
subtracting the estimated interference from the received signal, thereby obtaining a residual signal; and
adjusting the weighting factors at certain intervals so as to minimize the residual signal;
wherein said step of subtracting the estimated interference from the received signal includes subtracting the estimated interference of each station from the received signal before obtaining the estimated symbol values for the remaining stations among the stations.

42. The method of canceling interference in a code division multiple access receiver, comprising:
despreading a received signal obtained from signals transmitted by a plurality of stations, to obtain estimated symbol values of the signals transmitted from the stations;

calculating at least one weighting factor for each station among the stations;

estimating interference transmitted by each of the stations, including weighting and respreading the estimated symbol values, said weighting including multiplying the estimated symbol values by the respectively weighting factors;

adjusting the weighting factors at certain intervals;

subtracting the estimated interference from the received signal;

obtaining the estimated symbol values for different stations among the stations in series, wherein said subtracting the estimated interference from the received signal includes subtracting the estimated interference of each station from the received signal before obtaining the estimated symbol values for the remaining stations among the stations, and wherein said calculating at least one weighting factor for each station among the stations includes calculating the weighting factors from a residual serial signal left immediately after the subtracting the estimated interference of the station, and wherein said calculating at least one weighting factor for each station includes calculating the weighting factors for minimum power of the residual serial signal.

43. The method of canceling interference in a code division multiple access receiver, comprising:

despreading a received signal obtained from signals transmitted by a plurality of stations, to obtain estimated symbol values of the signals transmitted from the stations;

calculating at least one weighting factor for each station among the stations;

estimating interference transmitted by each of the stations, including weighting and respreading the estimated symbol values, said weighting including multiplying the estimated symbol values by the respectively weighting factors;

adjusting the weighting factors at certain intervals;

subtracting the estimated interference from the received signal;

obtaining the estimated symbol values for different stations among the stations in series, wherein said subtracting the estimated interference from the received signal includes subtracting the estimated interference of each station from the received signal before obtaining the estimated symbol values for the remaining stations among the stations, and wherein said calculating at least one weighting factor for each station among the stations includes calculating the weighting factors from a residual signal left after all stations' estimated interference has been subtracted from the received signal, for minimum power of the residual signal.

* * * * *